United States Patent
Panunzio et al.

(10) Patent No.: US 10,611,353 B2
(45) Date of Patent: Apr. 7, 2020

(54) BEARING DEVICE AND ELECTROMECHANICAL BRAKE BOOSTER

(71) Applicant: Robert Bosch GmbH, Stuttgart (DE)

(72) Inventors: Giammaria Panunzio, Ludwigsburg (DE); Ben Ferguson, Rettenberg (DE); Ignaz Hatt, Buchenberg (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/759,555

(22) PCT Filed: Jul. 18, 2016

(86) PCT No.: PCT/EP2016/067014
§ 371 (c)(1),
(2) Date: Mar. 13, 2018

(87) PCT Pub. No.: WO2017/045805
PCT Pub. Date: Mar. 23, 2017

(65) Prior Publication Data
US 2019/0152462 A1     May 23, 2019

(30) Foreign Application Priority Data

Sep. 14, 2015   (DE) .................. 10 2015 217 528

(51) Int. Cl.
*B60T 13/74*      (2006.01)
*B60T 11/18*      (2006.01)
(Continued)

(52) U.S. Cl.
CPC .............. *B60T 13/745* (2013.01); *B60T 7/02* (2013.01); *B60T 7/042* (2013.01); *B60T 11/18* (2013.01); *B60T 11/20* (2013.01); *B60T 17/221* (2013.01)

(58) Field of Classification Search
CPC .......... B60T 7/042; B60T 7/02; B60T 13/745; B60T 11/18; B60T 11/20; B60T 17/221
See application file for complete search history.

(56) References Cited

U.S. PATENT DOCUMENTS

| 5,185,915 A | * | 2/1993 | Osterday | ................. | B23P 19/00 |
| | | | | | 29/525 |
| 6,209,967 B1 | * | 4/2001 | Kramer | .................. | B60T 13/72 |
| | | | | | 303/114.3 |

(Continued)

FOREIGN PATENT DOCUMENTS

| CN | 103802814 A | 5/2014 |
| DE | 102010003822 A1 | 10/2011 |

(Continued)

OTHER PUBLICATIONS

International Search Report dated Sep. 28, 2016, of the corresponding International Application PCT/EP2016/067014 filed Jul. 18, 2016.

*Primary Examiner* — Bradley T King
*Assistant Examiner* — James K Hsiao
(74) *Attorney, Agent, or Firm* — Norton Rose Fulbright US LLP; Gerard Messina

(57) ABSTRACT

A bearing device for an electromechanical brake booster, it being optionally possible to fasten the first sliding bearing in the first receiving opening when the second sliding bearing is float-mounted in the second receiving opening or to fasten the second sliding bearing in the second receiving opening when the first sliding bearing is float-mounted in the first receiving opening, and, if the first sliding bearing is fastened on a first fastening element, it being possible to situate the bearing device between the two support elements spaced apart by a first interspace, and, if the second sliding bearing is fastened on a second fastening element, it being possible to situate the bearing device between the two support elements spaced apart by a second interspace. An electromechanical brake booster for a motor vehicle is also described.

13 Claims, 5 Drawing Sheets

(51) Int. Cl.
*B60T 7/04* (2006.01)
*B60T 7/02* (2006.01)
*B60T 17/22* (2006.01)
*B60T 11/20* (2006.01)

(56) References Cited

U.S. PATENT DOCUMENTS

| | | | |
|---|---|---|---|
| 9,701,296 B2 * | 7/2017 | Zhang | B60T 13/745 |
| 2012/0090316 A1 * | 4/2012 | Philippe | B60T 13/745 |
| | | | 60/545 |
| 2014/0090371 A1 * | 4/2014 | Yoshizu | B60T 13/745 |
| | | | 60/545 |

FOREIGN PATENT DOCUMENTS

| | | |
|---|---|---|
| DE | 102012205611 A1 | 10/2013 |
| DE | 102012014361 A1 | 1/2014 |
| DE | 102013006795 A1 | 10/2014 |
| EP | 2292483 A1 | 3/2011 |
| EP | 2465741 A1 | 6/2012 |
| EP | 2641796 A1 | 9/2013 |
| FR | 2947228 A1 | 12/2010 |
| JP | H09166137 A | 6/1997 |
| WO | 2011/147609 A1 | 12/2011 |
| WO | 2013045154 A1 | 4/2013 |

* cited by examiner

BEARING DEVICE AND ELECTROMECHANICAL BRAKE BOOSTER

FIELD

The present invention relates to a bearing device for an electromechanical brake booster of a motor vehicle. The present invention furthermore relates to an electromechanical brake booster for a motor vehicle.

BACKGROUND INFORMATION

Future drive concepts of motor vehicles require alternative brake pressure buildup devices since little or no vacuum is available in order to operate a conventional vacuum brake booster. Electric motor brake boosters were developed for this purpose.

German Patent Application No. DE 10 2012 014 361 A1 describes a control device for a master brake cylinder of a motor vehicle, comprising a housing to be situated between the master brake cylinder and a brake pedal, through which a pressure organ for controlling a control piston of the master brake cylinder runs, an electric motor, a worm, which is driven by the electric motor and which intersects the pressure organ, and a gear unit situated in the housing, which couples the worm with the control piston so as to translate a rotary motion of the worm into a translatory motion of the control piston.

Furthermore, three conventional dominant customer interfaces on an engine compartment splash wall of the motor vehicle for fastening vacuum brake boosters or electromechanical brake boosters are available. Distinguishing features of these customer interfaces are a number of bolt-on points, a hole pattern and a distance between holes.

SUMMARY

An object of the present invention is to provide a bearing device for an electromechanical brake booster of a motor vehicle and an electromechanical brake booster for a motor vehicle, which require for the customer interfaces described above as few components as possible for connecting to the customer interfaces.

This object may be achieve, for example, a bearing device for an electromechanical brake booster for a motor vehicle in accordance with an example embodiment of the present invention. The object may furthermore be achieved by an electromechanical brake booster for a motor vehicle in accordance with an example embodiment of the present invention.

The present invention provides a bearing device for an electromechanical brake booster, the bearing device being able to be situated on a spindle of the electromechanical brake booster in such a way that an operation of an electric motor of the electromechanical brake booster is able to adjust the spindle in a linear manner, whereby the bearing device is co-adjustable together with the spindle, and a first sliding bearing is insertable or is inserted in a first receiving opening of the bearing device and a second sliding bearing is insertable or is inserted in a second receiving opening of the bearing device in such away that the bearing device is additionally able to be situated on a first support element of the electromechanical brake booster via the first sliding bearing inserted into the first receiving opening and is able to be situated on a second support element of the electromechanical brake booster via the second sliding bearing inserted into the second receiving opening so that the bearing device co-adjusted together with the spindle is able to be guided between the two support elements, it being optionally possible to fasten the first sliding bearing in the first receiving opening when the second sliding bearing is float-mounted in the second receiving opening or to fasten the second sliding bearing in the second receiving opening when the first sliding bearing is float-mounted in the first receiving opening, and, if the first sliding bearing is fastened on the first fastening element, it being possible to situate the bearing device between the two support elements spaced apart by a first interspace and, if the second sliding bearing is fastened on the second fastening element, it being possible to situate the bearing device between the two support elements spaced apart by a second interspace.

The present invention furthermore provides an electromechanical brake booster for a motor vehicle, the electromechanical brake booster having a first support element and a second support element, the longitudinal axes of the support elements extending parallel to the straight line, a bearing device being situated on the spindle in such a way that the bearing device is adjustable together with the spindle, a first sliding bearing being inserted into a first receiving opening of the bearing device for supporting the first support element and a second sliding bearing being inserted into a second receiving opening of the bearing device for supporting the second support element, the first sliding bearing being optionally able to be fastened in the first receiving opening or the second sliding bearing being able to be fastened in the second receiving opening, and the first sliding bearing being able to be fastened on the bearing device at a first distance from the straight line and the second sliding bearing being able to be fastened on the bearing device at a second distance from the straight line, which differs from the first distance.

An example embodiment of the present invention may make it possible for all conventional customer interfaces, which have different hole spacings, to be attachable to one single bearing device of the spindle by providing that the first sliding bearing or the second sliding bearing are able to be fastened at a respective position in a receiving opening of the bearing device, the respective position having a different distance between the first sliding bearing and the second sliding bearing. The bearing device of the spindle supports the spindle on the first support element and the second support element, which compensate for or adapt tilting angles of the spindle and components connected to the spindle resulting from transverse forces or torque influences.

Advantageous specific embodiments and developments are described herein with reference to the figures.

A preferred development of the present invention provides for the bearing device to have a first fastening opening on which it is possible to fasten the first sliding bearing in the first receiving opening by orienting a fastening opening of the first sliding bearing to the first fastening opening of the bearing device and inserting a fastening element into the fastening opening of the first sliding bearing and the first fastening opening of the bearing device. It is thus possible to fasten the first sliding bearing at a desired position in the first receiving opening of the bearing device.

Another preferred development of the present invention provides for the bearing device to have a second fastening opening on which it is possible to fasten the second sliding bearing in the second receiving opening by orienting a fastening opening of the second sliding bearing to the second fastening opening of the bearing device and inserting a fastening element into the fastening opening of the second sliding bearing and the second fastening opening of the bearing device. It is thus possible to fasten the second sliding bearing at a desired position in the second receiving opening of the bearing device.

Another preferred development provides for the bearing device to have a center section, a first end section and a second end section, the bearing device being designed to have a cranked shape such that the center section in the installed state of the bearing device is situated in a first plane that is perpendicular to an adjustment axis of the spindle, and the first end section and the second end section of the bearing device being at least partially situated in a second plane at a distance from the first plane, which is perpendicular to the adjustment axis of the spindle. The cranked design of the bearing device thus advantageously makes it possible to provide additional space between the bearing device and a valve body situated adjacent to the bearing device.

Another preferred development provides for the center section of the bearing device to have a first recess in a first edge region and/or to have a second recess in a second edge region that is situated symmetrical about an axis with respect to the first recess, which is designed in the installed state of the bearing device to provide a space for a toothed wheel of the gear unit. Thus it is possible for the bearing device to be advantageously situated in the gear unit in a space-saving manner without it being necessary to relocate other components.

Another preferred development provides for the first and second fastening element to have a pin-shaped design, preferably in the form of a steel pin, which in the installed state has a press fit in the fastening opening of the first sliding bearing or of the second sliding bearing and in the first fastening opening of the bearing device or the second fastening opening of the bearing device. Thus it is possible to fasten the first sliding bearing or the second sliding bearing securely on the bearing device.

Another preferred development provides for the fastening opening of the first sliding bearing and of the second sliding bearing to have a first bore and a second bore, which are separated from one another by a groove developed circumferentially on an outer circumference of the first sliding bearing and of the second sliding bearing, the first bore being developed as a through-hole and the second bore having a shoulder, the first or second fastening element being introduced in such a way into the first sliding bearing or the second sliding bearing that the latter stops on the shoulder of the second bore and the first bore is deformed and/or closed by a caulking process. Thus it is possible to fasten the first sliding bearing or the second sliding bearing securely on the bearing device.

Another preferred development provides for the first sliding bearing to be inserted into the first receiving opening of the bearing device by way of the groove developed circumferentially on an outer circumference of the first sliding bearing, a gap being developed between the bearing device and the groove, the first sliding bearing being supported in the groove so as to be rotatable and tiltable relative to the bearing device about an axis situated parallel to the bearing device, and the second sliding bearing being inserted into the second receiving opening of the bearing device by way of a groove developed circumferentially on an outer circumference of the second sliding bearing, a gap being developed between the bearing device and the groove, the second sliding bearing being supported in the groove so as to be rotatable and tiltable relative to the bearing device about an axis situated parallel to the bearing device. In the event that the spindle and the bearing device that is rigidly connected to the spindle tilt, as a result of tolerances for example, the sliding bearing is thus able to compensate for the tilting of the spindle by tilting in the grove relative to the bearing device such that the bearing device is able to guide the spindle along the first and second support element without jamming.

Another preferred development provides for the first sliding bearing to be inserted into the first receiving opening of the bearing device along the groove developed circumferentially on the outer circumference of the first sliding bearing, a shape of the first sliding bearing being adapted to a shape of the first receiving opening of the bearing device, and the second sliding bearing being inserted into the second receiving opening of the bearing device along the groove developed circumferentially on the outer circumference of the second sliding bearing, a shape of the second sliding bearing being adapted to a shape of the second receiving opening of the bearing device. Thus it is advantageously possible to insert the first sliding bearing and the second sliding bearing into the respective receiving openings of the bearing device in a simple and precisely fitting manner.

Another preferred development provides for the groove developed circumferentially on the outer circumference of the first sliding bearing and the second sliding bearing to have a reduced width and/or depth in a predefined section, in the area of which the first sliding bearing or the second sliding bearing are able to be clamped on a wall of the bearing device when the electromechanical brake booster is transported. Thus it is possible to provide a simple and cost-effective transport lock since no additional components are required for securing the transport.

Another preferred development provides for the first support element and the second support element to have a tie rod or a pipe having an inner through bolt, the tie rod and the pipe having the inner through bolt being made of steel, and the tie rod having a smaller diameter than the pipe having the inner through bolt. Thus the first support element and the second support element are advantageously designed to absorb forces resulting from the customer interface as well as gear unit reaction forces.

Another preferred development provides for the first sliding bearing and the second sliding bearing to be identically constructed. This makes it advantageously possible to keep the number of required component low.

The described embodiments and developments may be combined with one another as desired.

Additional possible embodiments, developments and implementations of the present invention also include combinations of features of the present invention that are not explicitly mentioned above or below with respect to the exemplary embodiments.

BRIEF DESCRIPTION OF THE DRAWINGS

The figures are intended to provide a better understanding of the specific embodiments of the present invention. They illustrate specific embodiments and serve to explain features of the present invention in connection with the specification.

Other specific embodiments and many of the mentioned advantages result in view of the figures. The represented elements of the figures are not necessarily drawn to scale with respect to one another.

DETAILED DESCRIPTION OF EXAMPLE EMBODIMENTS

Unless indicated otherwise, identical reference symbols in the figures indicate identical or functionally equivalent elements, parts or components.

Figure 1:
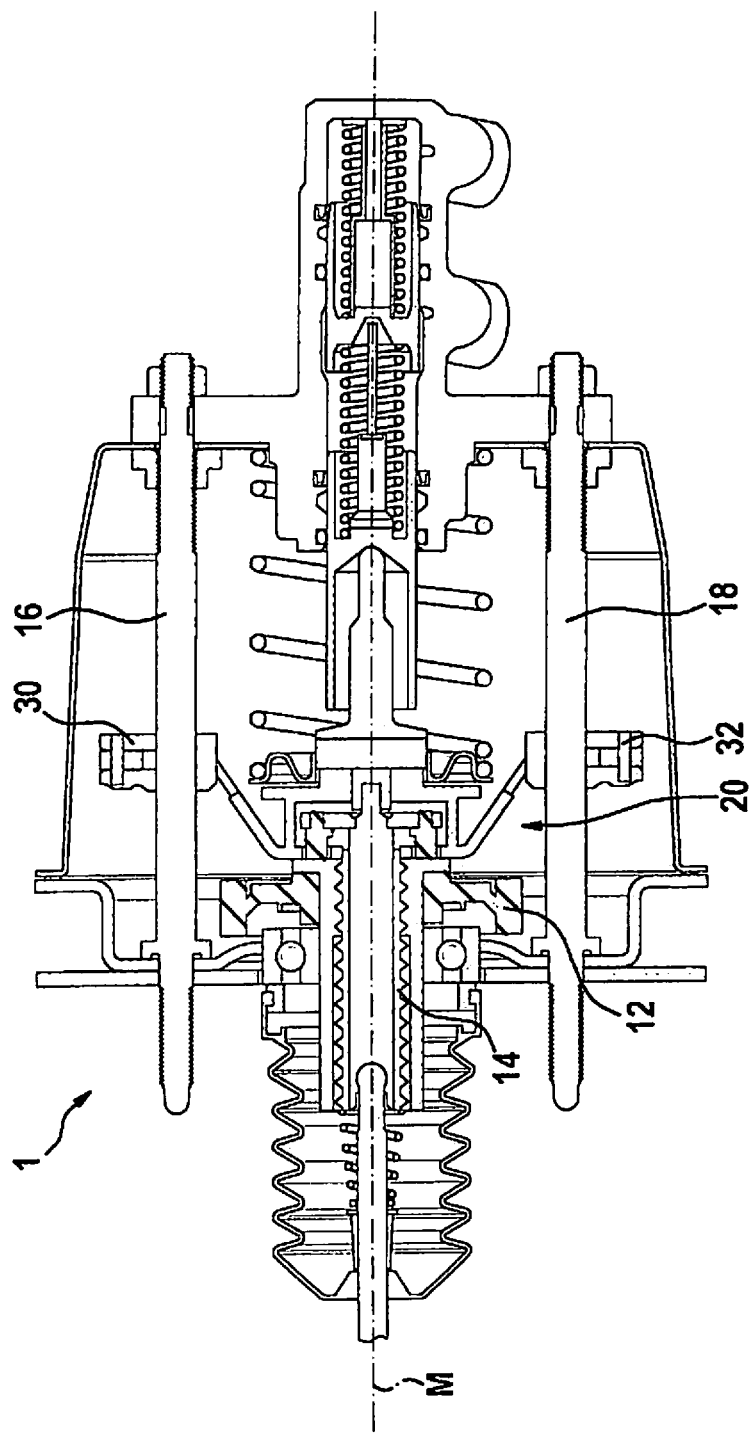
FIG. 1 shows a longitudinal sectional view of an electromechanical brake booster for a motor vehicle according to a first specific embodiment of the present invention.

FIG. 1 shows a longitudinal sectional view of an electromechanical brake booster for a motor vehicle according to a first specific embodiment of the present invention.

The electromechanical brake booster 1 for a motor vehicle has an electric motor 10, which is connected to a spindle 14 via a gear unit 12 in such a way that an operation of electric motor 10 is able to adjust spindle 14 in a linear manner in such a way that a center longitudinal axis M of spindle 14 is adjustable along a straight line.

The electromechanical brake booster 1 furthermore has a first support element 16 and a second support element 18. The longitudinal axes of support elements 16, 18 extend parallel to the straight line. A bearing device 20 is situated on the spindle 14 in such a way that bearing device 20 is adjustable together with spindle 14. For this purpose, a first sliding bearing 30 for supporting first support element 16 is inserted into a first receiving opening (not shown in FIG. 1) of bearing device 20. For this purpose, furthermore, a second sliding bearing 32 for supporting second support element 18 is inserted into a second receiving opening 23 (not shown in FIG. 1) of bearing device 20. Optionally, it is possible to fasten first sliding bearing 30 in the first receiving opening (not shown in FIG. 1) or to fasten second sliding bearing 32 in the second receiving opening (not shown in FIG. 1). It is possible to fasten first sliding bearing 30 at a first distance from second sliding bearing 32 or, alternatively, it is possible to fasten second sliding bearing 32 at a second distance from first sliding bearing 30 that is different from the first distance.

Furthermore, first support element 16 and second support element 18 preferably have a tie rod. Alternatively, first support element 16 and second support element 18 may have for example a pipe having an inner through bolt. The tie rod or alternatively the pipe having the inner through bolt are preferably made of steel. The tie rod preferably has a smaller diameter than the pipe having the inner through bolt.

Figure 2A:
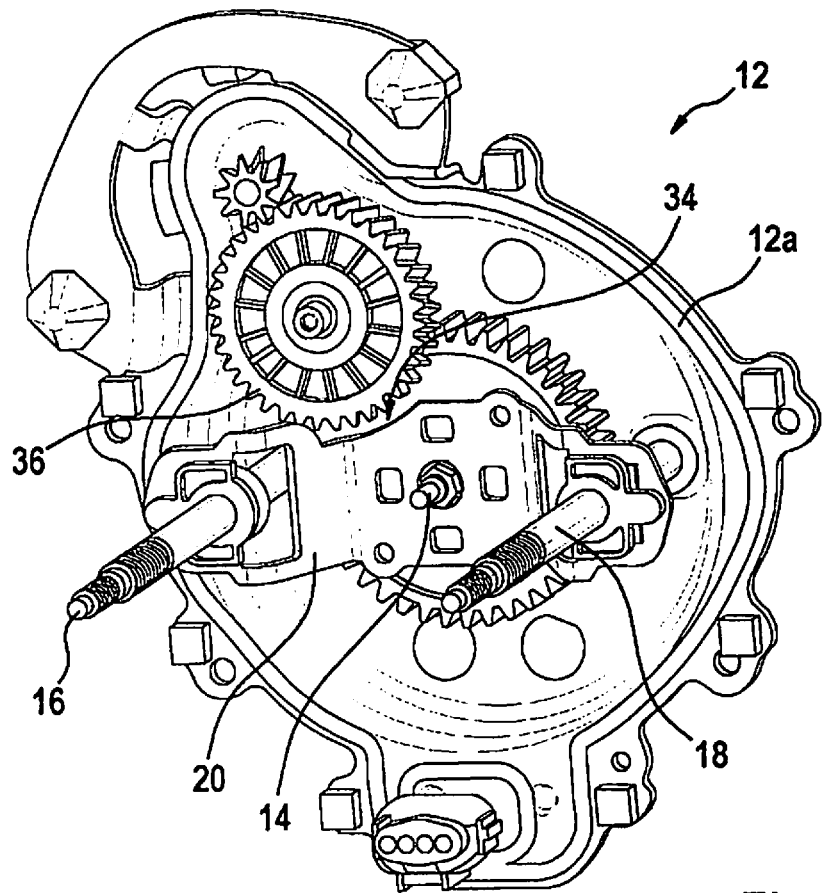
FIG. 2a shows a perspective representation of a gear unit of the electromechanical brake booster for the motor vehicle according to the first specific embodiment of the present invention.

FIG. 2 shows a perspective representation of a gear unit of the electromechanical brake booster for the motor vehicle according to the first specific embodiment of the present invention.

The first support element 16 and the second support element 18 are fastened on a gear unit housing bottom 12a of the gear unit. Furthermore, bearing device 20 is likewise situated adjacent to gear unit housing bottom 12a of gear unit 12 and is preferably welded to spindle 14. Alternatively, bearing device 20 may also be developed in one piece with the spindle or be connected in another suitable manner. In the present specific embodiment, bearing device 20 has a recess 34, which prevents a collision with a toothed wheel 36 of gear unit 12 and makes it possible for bearing device 20 to be situated in gear unit 12 in a space-saving manner.

Figure 2B:
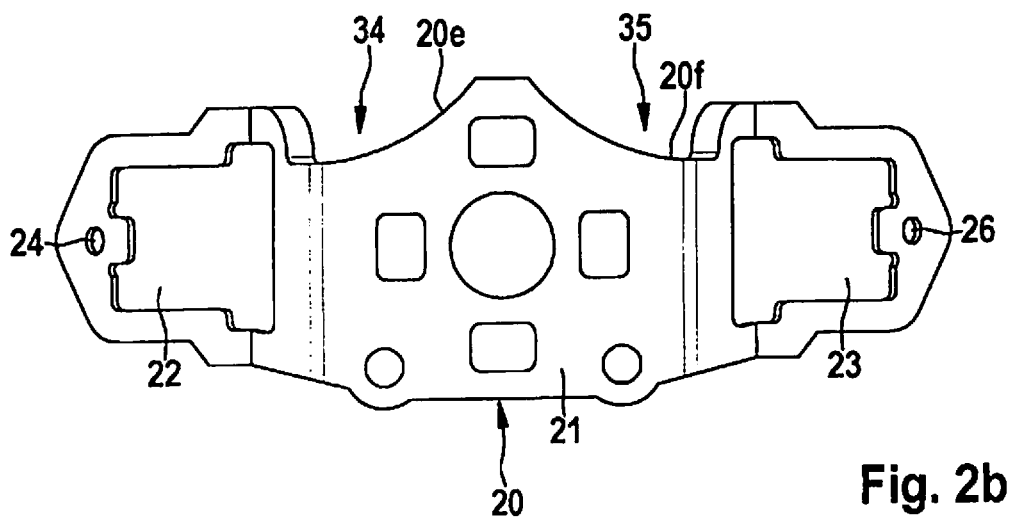
FIG. 2b shows a perspective representation of a bearing device of the electromechanical brake booster for the motor vehicle according to a second specific embodiment of the present invention.

FIG. 2b shows a perspective representation of a bearing device of the electromechanical brake booster for the motor vehicle according to a second specific embodiment of the present invention.

A first receiving opening 22 and a second receiving opening 23 are developed in bearing device 20. First receiving opening 22 is preferably able to receive a first sliding bearing (not shown in FIG. 2b). Second receiving opening 23 is preferably able to receive a second sliding bearing (not shown in FIG. 2b). Bearing device 20 furthermore has a first fastening opening 24 on an end section adjacent to first receiving opening 22. First fastening opening 24 is preferably designed to fasten the first sliding bearing (not shown in FIG. 2b) on bearing device 20 using a fastening element (not shown in FIG. 2b). Bearing device 20 furthermore has a second fastening opening 26 on an end section adjacent to second receiving opening 23. Second fastening opening 26 is preferably designed to fasten the second sliding bearing (not shown in FIG. 2b) on bearing device 20 using a fastening element (not shown in FIG. 2b).

First recess 34 is furthermore developed in bearing device 20 in a first edge region 20e. In a second edge region 20f, a second recess 35 is preferably developed. Second recess 35 is preferably situated symmetrically about an axis with respect to first recess 34. It is thus possible to use bearing device 20 according to the present specific embodiment even in a mirrored arrangement of the gear unit of the electromechanical brake booster without further modifications.

Figure 3A:
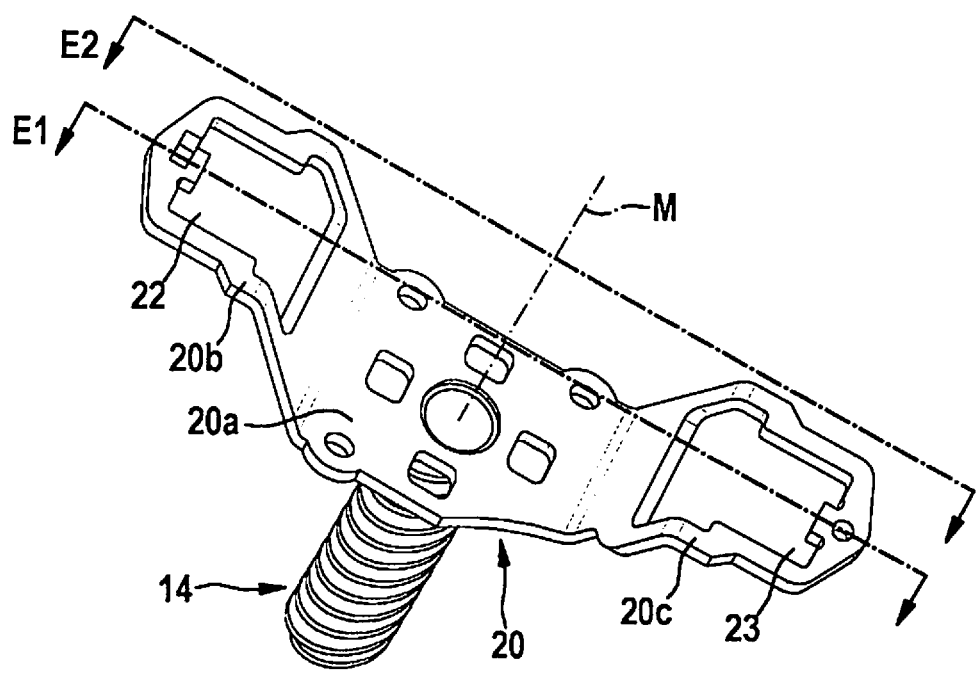
FIG. 3a shows a perspective representation of the bearing device of the electromechanical brake booster for the motor vehicle according to the first specific embodiment of the present invention.

FIG. 3a shows a perspective representation of the gear unit of the electromechanical brake booster for the motor vehicle according to the first specific embodiment of the present invention. Bearing device 20 preferably has a center section 20a, a first end section 20b and a second end section 20c. Bearing device 20 is preferably designed in a cranked shape so that the center section 20a, in the installed state of bearing device 20, is situated in a first plane perpendicular to the center longitudinal axis M of spindle 14, and the first end section 20b and the second end section 20c of bearing device 20 being situated at least partially in a second plane E2 that is perpendicular to the center longitudinal axis M of spindle 14.

Figure 3B:
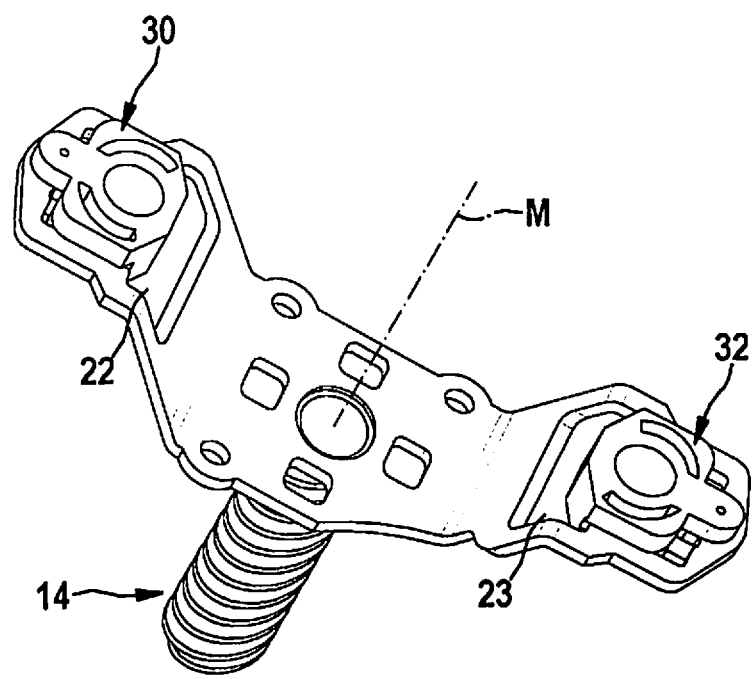
FIG. 3b shows a perspective representation of the bearing device of the electromechanical brake booster for the motor vehicle according to the first specific embodiment of the present invention.

FIG. 3b shows a perspective representation of the bearing device of the electromechanical brake booster for the motor vehicle according to the first specific embodiment of the present invention.

First sliding bearing 30 and second sliding bearing 32 are preferably identically constructed. First sliding bearing 30 is preferably inserted into the first receiving opening 22 of bearing device 20 along a groove (not shown in FIG. 3b) developed circumferentially on the outer circumference of first sliding bearing 30. A shape of first sliding bearing 30 is preferably adapted to a shape of first receiving opening 22 of bearing device 20.

Second sliding bearing 32 is preferably inserted into the second receiving opening 23 of bearing device 20 along a groove (not shown in FIG. 3b) developed circumferentially on the outer circumference of second sliding bearing 32. A shape of second sliding bearing 32 is preferably adapted to a shape of second receiving opening 23 of bearing device 20.

Figure 4:
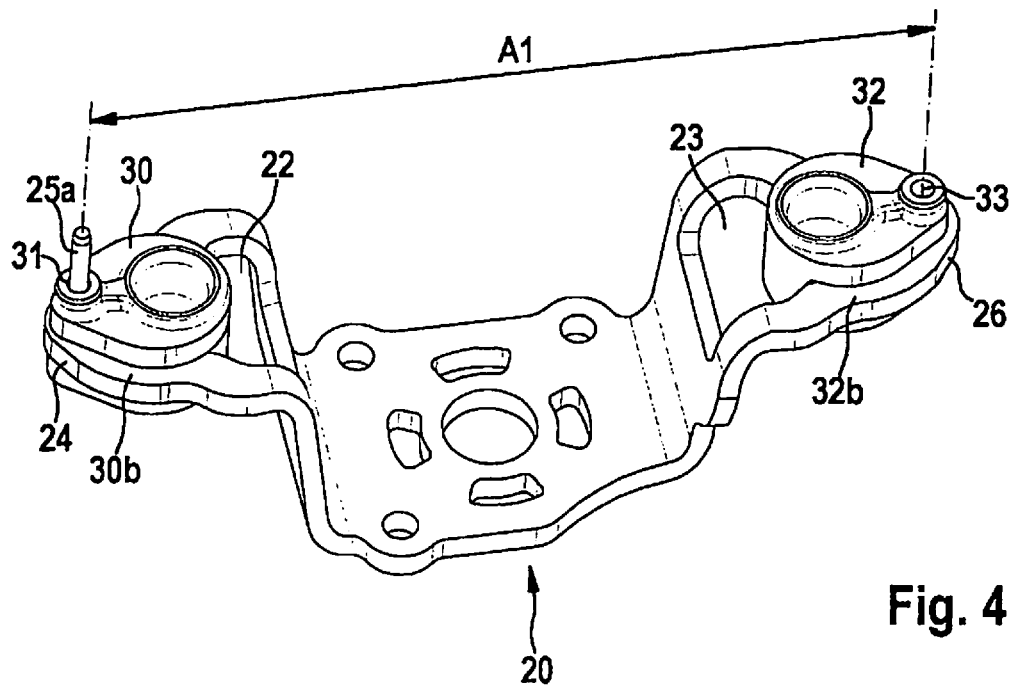
FIG. 4 shows a perspective representation of bearing device of the electromechanical brake booster for the motor vehicle according to the first specific embodiment of the present invention.

FIG. 4 shows a perspective representation of the bearing device of the electromechanical brake booster for the motor vehicle according to the first specific embodiment of the present invention. Bearing device 20 preferably has a first fastening opening 24.

First sliding bearing 30 is preferably inserted into the first receiving opening 22 of bearing device 20 along the groove 30b developed circumferentially on the outer circumference of first sliding bearing 30. Second sliding bearing 32 is preferably inserted into the second receiving opening 23 of bearing device 20 along a groove 32b developed circumferentially on the outer circumference of second sliding bearing 32.

First sliding bearing 30 preferably has a fastening opening 31. First fastening opening 24 of bearing device 20 and fastening opening 31 of sliding bearing 30 are preferably oriented toward each other. A first fastening element 25a, in the form of a steel pin, is preferably inserted into the first fastening opening 24 of bearing device 20 and the fastening opening 31 of first sliding bearing 30 that is oriented toward first fastening opening 24.

A first distance A1 between first sliding bearing 30 and second sliding bearing 32 is shown in FIG. 4. Second sliding bearing 32 is inserted into second receiving opening 23 of bearing device 20. Second sliding bearing 32 preferably has a fastening opening 33. A second fastening opening 26 is preferably developed on an end section of bearing device 20, which is situated adjacent to second receiving opening 23. Second sliding bearing 32 is preferably float-mounted and not fastened by a fastening element on bearing device 20.

Figure 5:
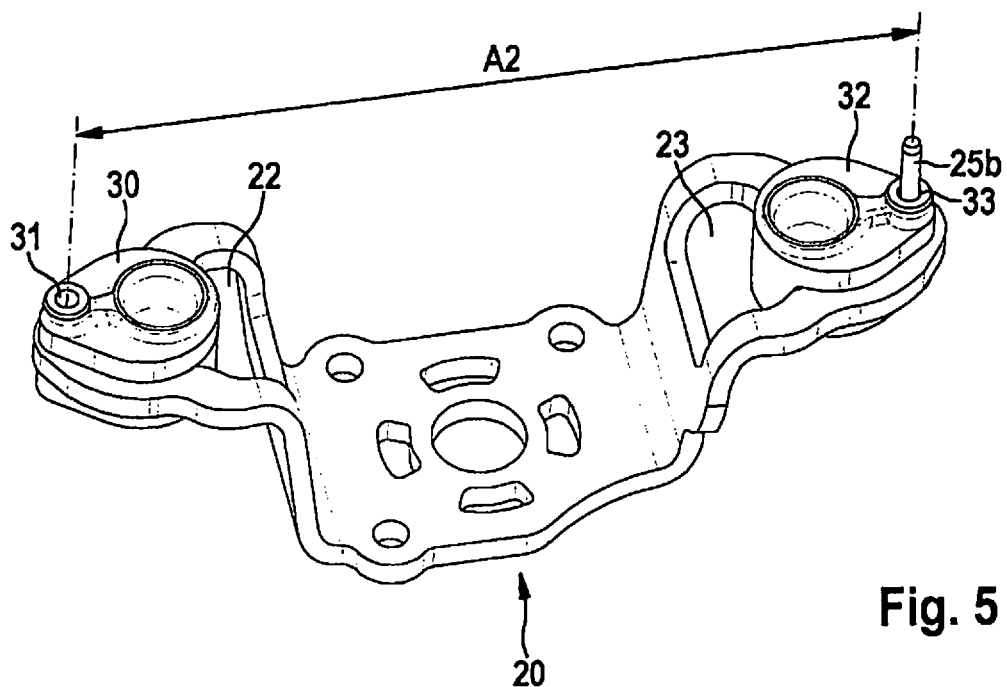
FIG. 5 shows a perspective representation of the bearing device of the electromechanical brake booster for the motor vehicle according to the first specific embodiment of the present invention.

FIG. 5 shows a perspective representation of the bearing device of the electromechanical brake booster for the motor vehicle according to the first specific embodiment of the present invention.

In the present representation, second sliding bearing 32 is fastened by a second fastening element 25b on bearing device 20. Second fastening element 25b is inserted into fastening opening 33 of the second sliding bearing and into second fastening opening 26 of bearing device 20 and is preferably press-fitted. A second distance A2 between first sliding bearing 30 and second sliding bearing 32 is shown in FIG. 5, first distance A1 (shown in FIG. 4) differing from second distance A2.

Due to the fact that first distance A1 differs from second distance A2, it is possible to provide a different hole spacing of first sliding bearing 30 to second sliding bearing 32 depending on whether first sliding bearing 30 or second sliding bearing 32 is fastened by first or second fastening element 25a, 25b on bearing device 20, the respectively other sliding bearing being float-mounted.

Figure 6:
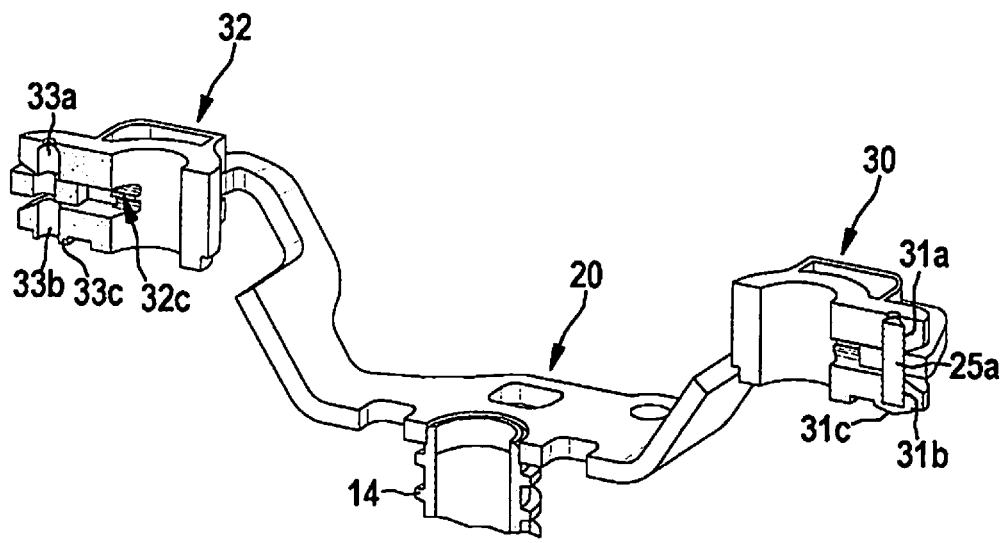
FIG. 6 shows a perspective representation of bearing device of the electromechanical brake booster for the motor vehicle according to the first specific embodiment of the present invention.

FIG. 6 shows a perspective representation of the bearing device of the electromechanical brake booster for the motor vehicle according to the first specific embodiment of the present invention.

A second sliding bearing 32 is inserted into a second receiving opening 23 of bearing device 20. When second sliding bearing 32 is inserted into second receiving opening 23 of bearing device 20, preferably a groove 32b developed circumferentially on an outer circumference 32a of second sliding bearing 32 embraces a wall 20d of bearing device 20 in the area of second receiving opening 23.

Figure 7:
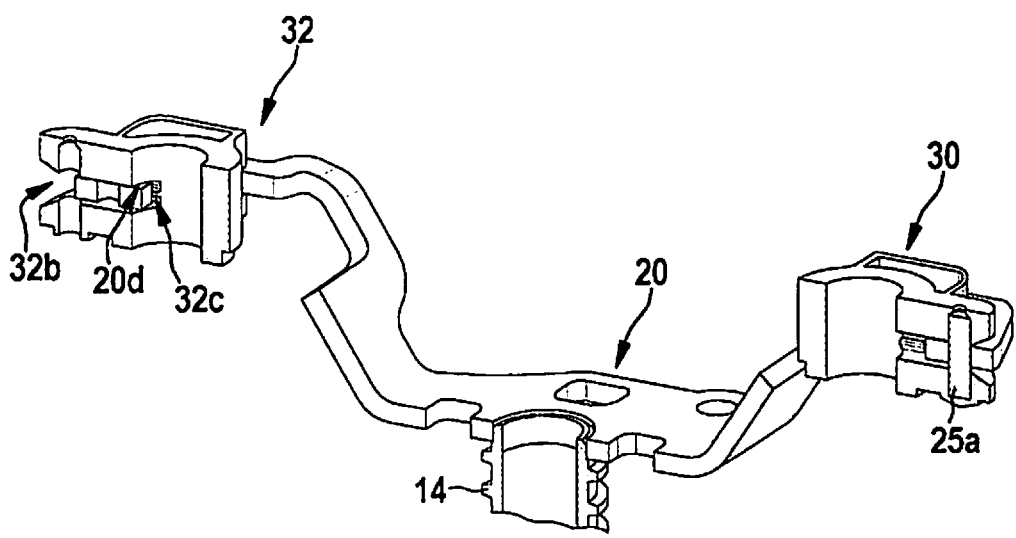
FIG. 7 shows a perspective representation of the bearing device of the electromechanical brake booster for the motor vehicle according to the first specific embodiment of the present invention.

FIG. 7 shows a perspective representation of the bearing device of the electromechanical brake booster for the motor vehicle according to the first specific embodiment of the present invention.

Second sliding bearing 32 is able to be fastened in second receiving opening 23 of bearing device 20 by a transport lock 32c. For this purpose, when being inserted into second receiving opening 23 of bearing device 20, second sliding bearing 32 is able to be clamped on a wall 20d of bearing device 20 on a predefined section, of a reduced width and/or depth, of the groove 32b developed circumferentially on outer circumference 32a of second sliding bearing 32.

Although the present invention was described above with reference to preferred exemplary embodiments, it is not limited to these, but rather may be modified in numerous ways. In particular, the present invention may be changed or modified in many ways without deviating from the essence of the present invention.

The bearing device may also have another suitable shape, for example, or be made from another suitable material. Furthermore, the sliding bearings may be fastened on the bearing device in a different manner for example.

LIST OF REFERENCE SYMBOLS 1 brake booster
10 electric motor
12 gear unit
12a gear unit housing bottom
14 spindle
16 first support element
18 second support element
20 bearing device
20a center section
20b first end section
20c second end section
20d wall
20e first edge region
20f second edge region
22 first receiving opening
23 second receiving opening
24 first fastening opening
25a first fastening element
25b second fastening element
26 second fastening opening
30 first sliding bearing
30a outer circumference
30b groove
31 fastening opening
31a first bore
31b second bore
31c shoulder
32 second sliding bearing
32a outer circumference 32b groove
32c transport lock
33 fastening opening
33a first bore
33b second bore
33c shoulder
34 first recess
35 second recess
36 toothed wheel
A1 first distance
A2 second distance
M center longitudinal axis

What is claimed is:

1. A device for an electromechanical brake booster of a motor vehicle, comprising:
   a bearing device having a first receiving opening at a first end and a second receiving opening at a second end opposite the first end, the bearing device configured to be situated on an axially displaceable spindle of the electromechanical brake booster;
   a first sliding bearing situated in the first receiving opening, the first sliding bearing having a bore extending all the way through the first sliding bearing, the first sliding bearing configured to receive, through the bore of the first sliding bearing, a first support element of the electromechanical brake booster; and
   a second sliding bearing situated in the second receiving opening, the second sliding bearing having a bore extending all the way through the second sliding bearing, the second sliding bearing configured to receive, through the bore of the second sliding bearing, a second support element of the electromechanical brake;
   wherein the first sliding bearing is configured to be, alternatively, float-mounted in the first receiving opening or fastened in the first receiving opening, and the second sliding bearing is configured to be, alternatively, float-mounted in the second receiving opening or fastened in the second receiving opening;
   wherein when the first sliding bearing is float-mounted in the first receiving opening and the second sliding bearing is fastened in the second receiving element, the bearing device is configured to be mounted, via the first sliding bearing and the second sliding bearing, on the first support element and on the second support element, the first support element being spaced apart from the second support element by a first distance; and
   wherein when the first sliding bearing is fastened in the first receiving opening and the second sliding bearing is float-mounted in the second receiving opening, the bearing device is configured to be mounted, via the first sliding bearing and the second sliding bearing, on the first support element and on the second support element, the first support element being spaced apart from the second support element by a second distance different from the first distance.

2. The device as recited in claim 1, wherein:
   the bearing device has a first fastening opening adjacent to the first receiving opening;
   the first sliding bearing has a fastening opening; and
   the first sliding bearing is fastened in the first receiving opening and to the bearing device by a first fastener, the first fastener extending through the first fastening opening and extending in the fastening opening of the first sliding bearing.

3. The device as recited in claim 1, wherein:
   the bearing device has a second fastening opening adjacent to the second receiving opening;
   the second sliding bearing has a fastening opening; and
   the second sliding bearing is fastened in the second receiving opening and to the bearing device by a second fastener, the second fastener extending through the second fastening opening and extending in the fastening opening of the first sliding bearing.

4. The device as recited in claim 1, wherein:
   the bearing device has a first fastening opening adjacent to the first receiving opening and a second fastening opening adjacent to the second receiving opening;
   each of the first sliding bearing and the second sliding bearing has a fastening opening; and
   one of: (i) the first sliding bearing is fastened in the first receiving opening and to the bearing device by a first fastener, the first fastener extends through the first fastening opening and extends in the fastening opening of the first sliding bearing, the first fastener being a steel pin, or (ii) the second sliding bearing is fastened in the second receiving opening and to the bearing device by a second fastener, the second fastener extends through the second fastening opening and extends in the fastening opening of the second sliding bearing, the second fastener being a steel pin.

5. The device as recited in claim 1, wherein the part has a center section, a first end section, and a second end section, the first sliding bearing being mounted on the first end section, and the second sliding bearing being mounted on the second end section, and the center section being situated between the first end section and the second end section, and wherein the center section is situated in a first plane, and the first end section and the second end section of the bearing device being at least partially situated in a second plane different from the first plane.

6. The device as recited in claim 5, wherein the first plane is perpendicular to an adjustment axis of the spindle.

7. The device as recited in claim 5, wherein the center section of the bearing device has a first cut-out in a first edge region, and a second cut-out in a second edge region that is situated symmetrical about an axis with respect to the first cut-out.

8. An electromechanical brake booster for a motor vehicle, comprising:
   a spindle connected to an electric motor by a gear unit, the spindle configured to move in linear fashion via the electric motor and the gear unit so that the spindle is moved in a straight line along a center longitudinal axis of the spindle;
   a first support element and a second support element, a longitudinal axis of each of the first support element and the second support element being parallel to the longitudinal axis of the spindle;
   a bearing device fixedly situated on the spindle in such a way that the bearing device is moved in the linear fashion together with the spindle when the spindle is moved in the straight line, the bearing device having a first receiving opening at a first end and a second receiving opening at a second end opposite the first end;
   a first sliding bearing situated in the first receiving opening, the first support element extending through the first sliding bearing; and
   a second sliding bearing situated in the second receiving opening, the second support element extending through the second sliding bearing;
   wherein the first sliding bearing is configured to be, alternatively, float-mounted in the first receiving opening or fastened in the first receiving opening, and the second sliding bearing is configured to be, alternatively, float-mounted in the second receiving opening or fastened in the second receiving opening;

wherein when the first sliding bearing is float-mounted in the first receiving opening and the second sliding bearing is fastened in the second receiving element, the bearing device is configured to be mounted, via the first sliding bearing and the second sliding bearing, on the first support element and on the second support element, the first support element being spaced apart from the second support element by a first distance; and wherein when the first sliding bearing is fastened in the first receiving opening and the second sliding bearing is float-mounted in the second receiving opening, the bearing device is configured to be mounted, via the first sliding bearing and the second sliding bearing, on the first support element and on the second support element, the first support element being spaced apart from the second support element by a second distance different from the first distance.

9. The electromechanical brake booster as recited in claim 8, wherein:

the bearing device has a first fastening opening adjacent to the first receiving opening and a second fastening opening adjacent to the second receiving opening;

each of the first sliding bearing and the second sliding bearing has a fastening opening; and one of: (i) the first sliding bearing is fastened in the first receiving opening and to the bearing device by a first fastener, the first fastener extends through the first fastening opening and extends in the fastening opening of the first sliding bearing, the first fastener being a steel pin, or (ii) the second sliding bearing is fastened in the second receiving opening and to the bearing device by a second fastener, the second fastener extends through the second fastening opening and extends in the fastening opening of the second sliding bearing, the second fastener being a steel pin.

10. The electromechanical brake booster as recited in claim 9, wherein the fastening opening of the first sliding bearing has a first bore and a second bore which are separated from one another by a groove on an outer circumference of the first sliding bearing, the fastening opening of the second sliding bearing has a third bore and a fourth bore which are separated from each other by a groove on an outer circumference of the second sliding bearing, each of the first bore and the third bore being a through-hole and each of the second bore and the fourth bore having a shoulder, and wherein when the first sliding bearing is fastened in the first receiving opening, the first fastener stops on the shoulder of the second bore, and when the second sliding bearing is fastened in the second receiving opening, the second fastener stops on the shoulder of the fourth bore.

11. The electromechanical brake booster as recited in claim 10, wherein the first sliding bearing is supported on the bearing device via the groove of the first sliding bearing, a gap being situated between the bearing device and the groove of the first sliding bearing, the first sliding bearing being supported via the groove of the first sliding bearing so as to be rotatable and tiltable relative to the bearing device about an axis situated parallel to the bearing device, and the second sliding bearing is supported on the bearing device via the groove of the second sliding bearing, a gap being situated between bearing device and the groove of the second sliding bearing, the second sliding bearing being supported via the groove of the second sliding bearing so as to be rotatable and tiltable relative to the bearing device about the axis situated parallel to the bearing device.

12. The electromechanical brake booster as recited in claim 8, wherein the first support element and the second support element have (i) a tie rod made of steel, or (ii) a pipe made of steel having an inner through bolt.

13. The electromechanical brake booster as recited in claim 8, wherein the first sliding bearing and the second sliding bearing are identical to one another.

* * * * *